United States Patent [19]

Thiel et al.

[11] 4,147,492
[45] Apr. 3, 1979

[54] MACHINE PRESS, SPECIFICALLY A STAMPING PRESS

[75] Inventors: Alfons W. Thiel, Mainz; Hans Hell, Wiesbaden-Freudenberg, both of Fed. Rep. of Germany

[73] Assignee: Bellapast GmbH, Wiesbaden-Biebrich, Fed. Rep. of Germany

[21] Appl. No.: 881,061

[22] Filed: Feb. 24, 1978

Related U.S. Application Data

[63] Continuation of Ser. No. 772,091, Feb. 27, 1977, abandoned, which is a continuation-in-part of Ser. No. 602,126, Aug. 5, 1975, abandoned.

[51] Int. Cl.² ............... B29C 17/00; B30B 15/06
[52] U.S. Cl. ............................. 425/394; 425/592; 425/450.1
[58] Field of Search ............... 425/394, 350.1, 451.4, 425/451.5, 451.6, DIG. 220, DIG. 222, 589, 592, 593

[56] References Cited

U.S. PATENT DOCUMENTS

| | | | |
|---|---|---|---|
| 2,363,107 | 1/1944 | Young | 425/451.4 X |
| 2,651,809 | 9/1953 | Mechur et al. | 425/394 X |
| 3,719,445 | 3/1973 | Sindelar | 425/451.5 X |
| 3,773,446 | 11/1973 | Borrini | 425/451.4 X |

Primary Examiner—J. Howard Flint, Jr.
Attorney, Agent, or Firm—Strauch, Nolan, Neale, Nies & Kurz

[57] ABSTRACT

A stamping press, as for stamping molded articles out of a plastic web wherein the articles are premolded, has a fixed stamping tool section accurately secured on the press frame and a movable tool section slidably mounted on fixed columns on the fixed tool section and connected by operating linkage to power driven devices on the frame, the linkage including adjustments for tool alignment, stroke and frequency. Push rods in the linkage transmit movement to the movable tool section from cam controlled rocker arms, and the push rods are removably hinged to the movable tool section to disconnect and remove the latter. Secondary devices such as ejectors and further tools are actuated in synchronism with the stamping tool.

12 Claims, 8 Drawing Figures

MACHINE PRESS, SPECIFICALLY A STAMPING PRESS

This is a continuation of application Ser. No. 772,091, filed Feb. 27, 1977, now abandoned, which in turn is a continuation-in-part of copending application Ser. No. 602,126 filed Aug. 5, 1975, now abandoned.

This invention concerns a machine press, specifically a stamping press, with press frame, having a tool consisting of at least two parts moving in opposite directions and accurately guided e.g. by tool guide columns and provisions for generating and transmitting forces and movements required by the tool.

Existing machine presses of this type incorporate devices to hold the tool, with two tool carriers moving in opposite directions; one attached to the press in the form of a plate for the fixed part of the tool and the other to a ram guided in the press.

This is true for gap frame presses in which the guide of the ram is in one gap of the frame, as well as for gate frame presses in which the ram is guided in the two stands of the gate frame, or with the column frame press where the ram is guided at the columns (ref. Lueger, Vol. 9, Encyclopedia for Production Technology and Process Machinery, pp. 159 thru 165). With existing presses there are thus provisions for a double guide if the tool has its own guides, e.g. guide columns for the parts moving in opposite directions. This alone makes it mandatory that, with the insertion of the tool into the press, care be taken to insure precise and accurate parallel operation of the press and tool guides, to, in turn, provide for a smooth and wear-free process.

Due to the configuration of the press ram as a guided section of the press, on which the moving part of the tool is to be mounted, existing machine presses involve considerable masses that move back and forth or up and down. Thereby, vibration during operation cannot be avoided and considerable foundation measures are required, and the operating speed of the press is severely limited.

The main object of the invention is to provide a machine press which is suitable for high operating speeds and quiet operation, i.e. minimum vibration during operation, simple assembly and adjustment of tools.

This objective is specifically achieved in the invention in that the holding devices for the tools are designed for the attachment of a section of the tool which remains stationary with reference to the press frame, while the attachments for generating and transmitting forces and movements required at the tool are installed directly on at least one of the major moving parts of the tool. On the other hand, the guidance required for transmitting forces and movements to the tool is achieved solely through the guide mechanisms contained on the tool proper. This means that there is no longer a need for a press ram as a guided tool carrier. In lieu of the ram, only those mechanisms required for the transmission of forces and movements to the section of the tool to be moved must be provided. This will result in a considerable reduction of moving mass which consists basically of the moving section of the tool. By utilizing the inherent guides of the tool also as guides for transmission of forces and movements, the previously required double guide is no longer necessary. This also obviates the difficult adjustment and assembly work required in providing an absolute parallel operation of the press and tool guide mechanism, which is rarely achieved in practice. The adjustment of the tool inserted into the press is made considerably simpler, since the only remaining requirement is an accurate opposite positioning of the tool parts. Through the reduction of the moving mass and the existence of only one guide mechanism, the press is also suitable for fast operating modes assuring virtually vibration-free quiet and smooth operation.

It is especially advantageous to design the tool receptacles to consist of several, or a minimum of two, separate contact and mounting surfaces on the frame of the press for that section of the tool which is fixed with reference to the press frame, while the section of the tool which is to be moved in relation to the press frame is positioned to the fixed section of the tool and thus at the press frame by those guides which are part of the tool proper. This has the particular advantage of greatly simplifying attachment of the fixed section of the tool, since several or a minimum of two separate, relatively small contact and mounting surfaces can be very accurately designed on the press frame and since the corresponding surfaces on the fixed section of the tool provide equally accurate machining. The attachment of the fixed section of the tool with its properly machined surfaces to the contact and mounting surfaces on the frame of the press already provides the necessary accuracy and adjustment for the operation of the fixed section of the tool, so that the only remaining adjustment required consists of proper opposite positioning of the tool sections. An added advantage is the fact that the section of the tool to be moved is supported by the press frame through those guides which are part of the tool proper rather than on a ram. It is recommended, within the scope of the invention, to reinforce the design of the tool guides which will impart increased stability to the tool and be of advantage for the tool, especially for tools subject to high stress.

In a preferred structural configuration of the invention, the mechanisms for generating and transmitting movements and forces are applied through a pair of push rods at the tool section to be moved, the push rods being articulated at the opposite lateral ends of the tool section to be moved. The utilization of such a pair of push rods, as compared with hitherto conventional press rams, causes a sizable reduction of mass moved back and forth or up and down and yet assures uniform transmission of force to the tool. Furthermore, the push rods provide for especially simple adjustment of the tool sections in their contact position. To cite an example, joint bolts provided for an articulation of the push rods at the tool could conceivably be mounted eccentrically for adjustment. An even simpler adjustment is possible by making each push rod adjustable in length, independent of the other push rod. The adjustment of the push rod has to be done only once, namely when the press is assembled, and need not be repeated after a change of tools.

With this preferred configuration each push rod can be provided with an eye and be mounted on an easily removable hinge bolt on the tool for simple and fast replacement of the latter. In order to replace the tool, it is then only necessary to remove the hinge bolts from the tool section to be moved and to remove the entire tool from the press frame, specifically from the contact and mounting surfaces on the frame of the press. It is equally easy to attach the tool. For this purpose, the push rods with their eyes are brought close to the tool section to be moved. Then, that section is brought into the proper position, so that the hinge bolts may be inserted into the eyes of the push rods.

An especially stable design of the tool and a smooth operation may be achieved if, with the above preferred configuration of the invention, a pair of column guides is associated with each linked section for a push rod on the tool, whereby the column guides are mounted adjacent and on either side of the linked section. The tool may also be provided with a stripping plate which is mounted on the moving section of the tool in its direction of movement and which can be adjusted to a limited extent against a spring. The mount and guide sections of this stripping plate are arranged adjacent to the linked section of the push rods on the moving section of the tool.

With the above preferred configuration of the invention, the two push rods may be articulated on the end opposite the tool and connected to a rocker arm tied in with the drive. This assures complete synchronization of movement and a precise adjustment capability on the push rod. The amplitude of the rocker arm may be designed so that the displacement of the tool can be adjusted. Arrangements may be made to connect the usual devices for press drives in front of the rocker arm, e.g. hydraulic systems etc. A particularly favorable design for fast operation would be a configuration in which the rocker arm would be provided with an additional arm with a linked driving rod adjustable in length the other end of which is mounted on the journal of an adjustable eccentric drive. This relatively simple device offers the additional advantage of easy adjustment of desired tool displacement. All that is required is the adjustment of the desired displacement at the eccentric drive and the readjustment, at the adjustable driving rod, of the contact position of the tool sections moving in opposite direction.

Furthermore, all conventional drive mechanisms, e.g. an electric motor and a reduction gear with infinitely variable gear ratio, may be installed in front of the eccentric drive.

The rocker arm assembly carrying the push rods or connected with them may deviate slightly from the precise parallel arrangement with reference to the tool. This deviation will be compensated by the one-time adjustment at the push rods. This is an advantage that the pre-connected components, in particular the rocker arm assembly, can be designed with much less attention to accuracy which considerably reduces the manufacturing cost of the stamping press.

Within the scope of the invention, secondary, moving sections of the tool, e.g. ejectors, may be installed, mounted or guided at the frame of the press and driven by separate units for which the power is derived from the press drive. On existing presses, the drive systems for secondary moving parts must be installed at the ram of the press. Aside from the fact that these secondary moving parts and their drive systems were included in the mass that is moved back and forth or up and down, such an arrangement required relatively difficult and hard-to-adjust control devices for the movement of those parts. In the installation of the invention, the mounting and guidance of the secondary moving parts at the frame of the press and the derivation of the power from the press drive, these components are not only largely separated from the mass that is moved back and forth or up and down, but any desired type of movement control or any desired sequence of the movement can be achieved with relatively simple means. On the other hand, with the derivation of the power from the press drive, complete synchronization with the movements of the main section of the tool is assured. For example, the drive units for the secondary moving parts of the tool can be designed to advance with the moving section of the tool and subsequent working stroke of the secondary moving parts. The drive units for the secondary moving sections can be designed with a cam connected to the press drive and a linkage which transmits the movement from the cam to the secondary moving sections of the tool.

Within the scope of the invention, the press is designed to receive, in addition to the main tool assembly, a synchronously driven second tool assembly in the form of a follow-on tool, whereby the second tool assembly can be provided with a separate drive mechanism which derives its power from the drive of the press. In this manner, the type and sequence of movement of the second tool assembly can be arranged as desired, retaining full synchronization with the main tool assembly.

Within the scope of the invention, the press can also be equipped with an automatic advance which is driven synchronously with the tool or main tool assembly, e.g. by means of a cam or linkage.

A particularly advantageous application and structural configuration of the machine press in accordance with the invention would be for the stamping of blanks from a material feeder belt. This material feeder belt with premolded blanks could be a plastic feeder belt which comes from a heat mold and from which the blanks are to be cut. For this purpose, the tool assembly can be designed for stamping the blanks from the surrounding feeder belt and can include devices for precisely aligning the blanks to be stamped in relation to the stamping tool, while the automatic advance of the machine press provides access to the feeder belt at the end of the advance cycle for precise alignment of the blanks. With this application, the stamping press may contain as a second tool a stamping device to cut-up to remainder to the feeder belt after stamping out of the blanks.

A preferred embodiment of the invention is explained as an example in the following:

The drawings show a stamping press with a horizontally acting stamping tool 1, i.e. a stamping tool, the moving tool section 2 of which is moved back and forth horizontally. The fixed section 3 of the tool is attached to the frame of the press 4, i.e. its front frame 5. As shown in FIGS. 1, 2, 5 and 6, the front frame 5 consists of two laterally spaced vertical support beams 5' with laterally aligned recesses 6 on the front side of each for mounting the lateral end sections of the fixed part 3 of the tool. The inside forwardly facing surface 7 of each recess 6 is machined flat as a contact and locating surface for the fixed part 3 of the tool.

Figure 3:
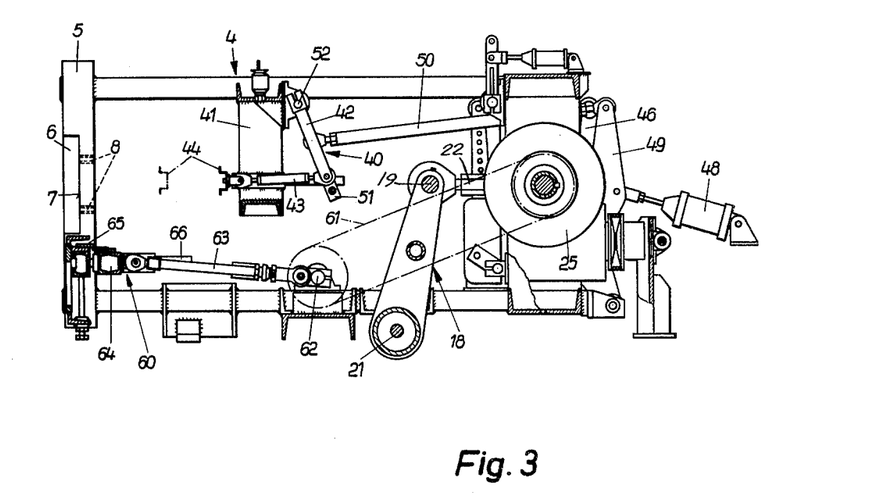
FIG. 3 is a side view of the stamping press similar to FIG. 1 but without the stamping tool.
Figure 7:
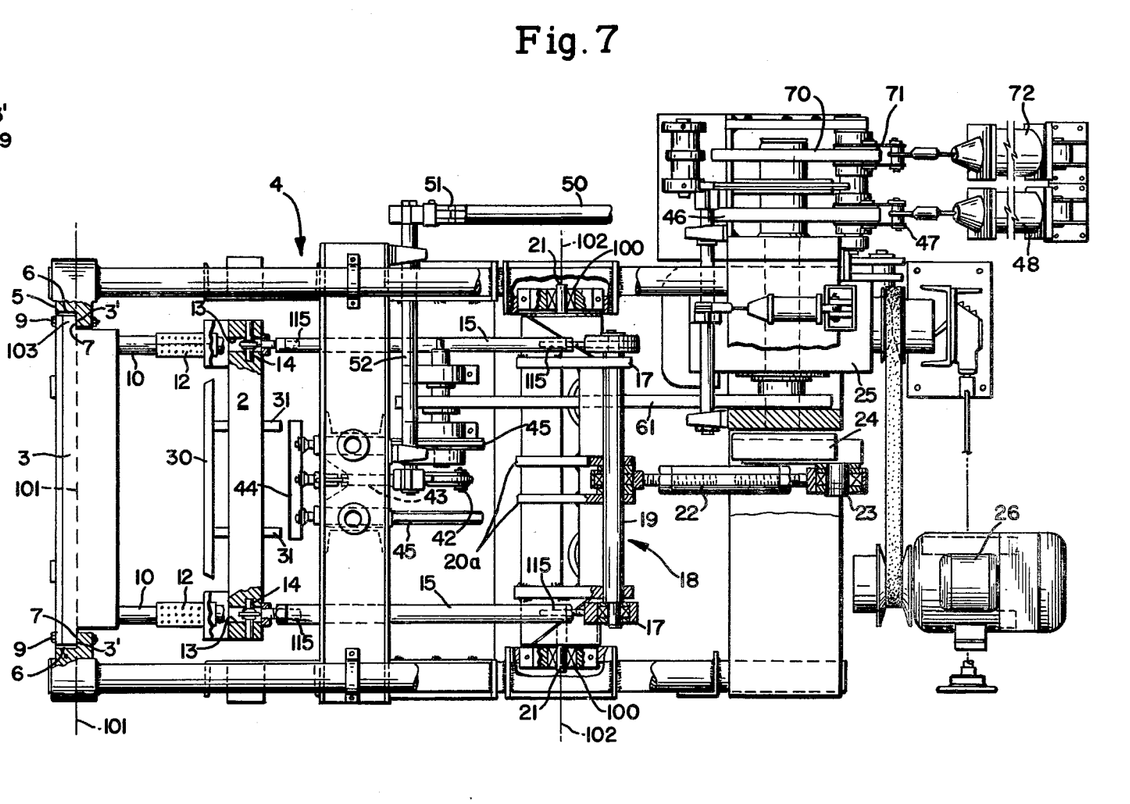
FIG. 7 is a top plan view partly in section similar to FIG. 4 but showing further detail.
Figure 8:
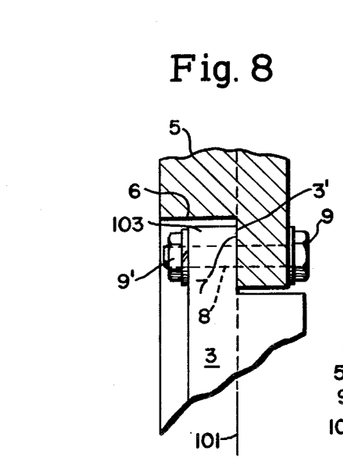
FIG. 8 is an enlarged fragmentary view partly in section showing the accurate planar seating in the fixed tool section on the frame.

As shown in FIGS. 7 and 8 the fixed tool section 3 at its laterally opposite ends has flangelike extensions 103. Such flangelike extensions 103 have machined flat faces 3' that are in contact with the machined flat contact surfaces 7 provided on the vertical frame arms. The fixed tool section 3 is mounted and held in place by bolts 9, which extend through each of flanges 103 and the vertical frame elements in the region of the contact surfaces 7. The bore holes 8 receiving bolts 9 are indicated in FIGS. 3 and 8. By such bolts 9 the fixed tool section 3 is held on the frame with the surfaces 7 and 3' in full surface contact, so that thereby the fixed tool section 3 is located in a well defined position or condition at the front frame 5.

The fixed section 3 of the tool carries four parallel guide columns 10, there being two vertically aligned parallel guide columns 10, at each side and one above the other, extending horizontally toward the inside of the frame 5. The forward ends of columns 10 are threaded and extend through openings 10' in fixed tool part 3 whereby to receive nuts 9' that secure them fixedly upon tool part 3. The moving section 2 of the tool is slidably guided by and along these columns by means of bushings 11 and within these bushings by ring bearings 12 on the guide columns. Thus the movable section of the tool is slidably mounted on the fixed section of the tool. On each of its laterally outer ends, the moving section 2 of the tool has articulated joints for push rods, i.e. a recess 13 located about midway between bushings 11 at that side and through which a hinge bolt 14 extends horizontally at right angles to the guide columns 10. Mounted pivotally on these hinge bolts 14 are two laterally spaced push rods 15 as by lugs 16. These push rods 15 are shown connected in FIG. 7.

Figure 1:
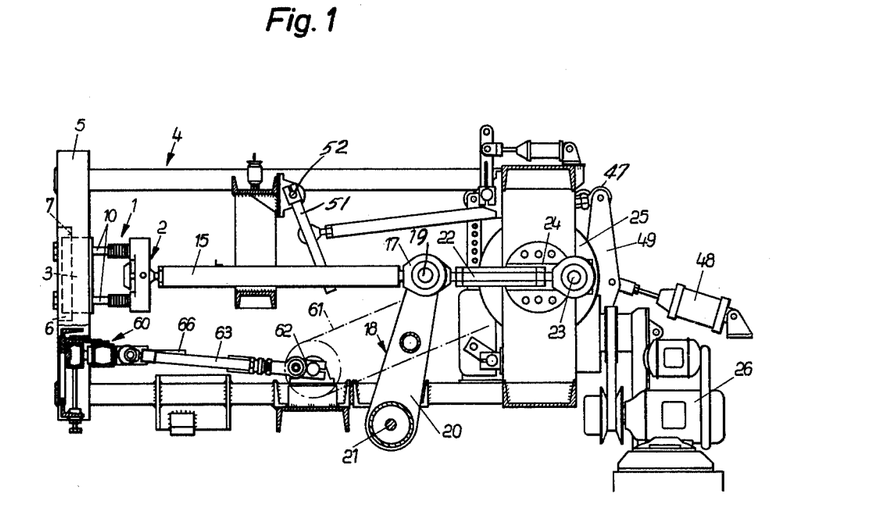
FIG. 1 shows in side elevation a stamping press in accord with a preferred embodiment of the invention.
Figure 4:
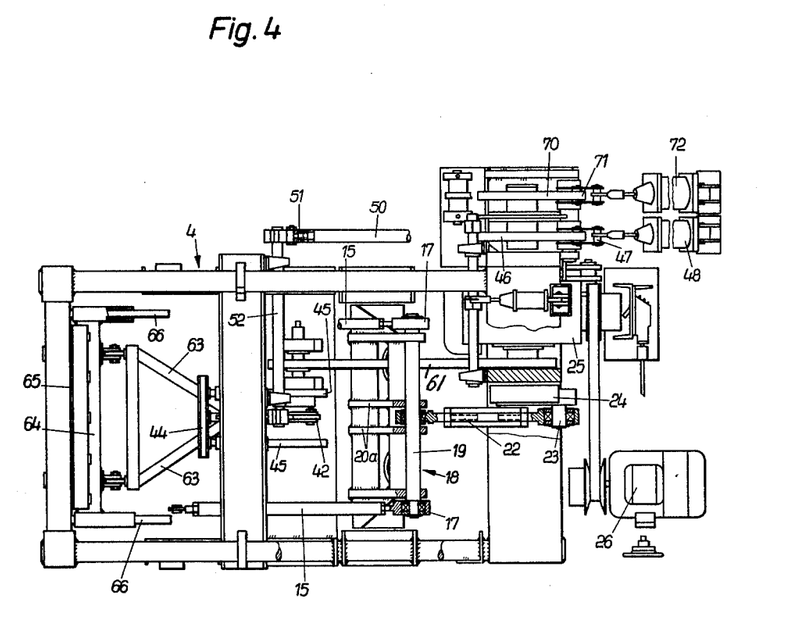
FIG. 4 is a top view of the stamping press of FIGS. 1 through 3, also without the stamping tool to simplify the showing.

As shown in FIGS. 1, 3 and 4, the two push rods have lugs 17 on their rear ends, by which they are pivotally linked to traverse rods 19 of a rocker arm assembly 18. In the example shown, the rocker arm assembly, in addition to the traverse rod 19, contains four rocker arms 20 which pivot about a common axis 102 at pivot shaft 21. Bearings 100 on the press frame 4 support the ends of shaft 21 which extends substantially parallel to plane 101. The two center arms 20 form a central arm 20a to which one end of a drive rod 22 is pivotally linked. The drive rod 22 at its other end is pivotally mounted on pin 23 of a drive eccentric 24 which is rotated by an electric motor 26 through a transmission 25 having an infinitely variable gear ratio.

As shown in the drawings, the two substantially parallel push rods 15 shown in FIG. 4 connect at the two ends of the moving section 2 of the tool, i.e. essentially vertically midway between the two guide columns 10 which are arranged one above the other at each side. The hinge bolts 14 required for the linking of the two push rods 15 to the moving tool section at these points can easily be removed so that the joints between the push rods 15 and the moving section of the tool 2 can be readily disengaged.

Both push rods 15 can be easily independently adjusted in length, e.g. through the two lugs 16 and 17 which are screwed into the rods by means of counter threads and secured with lock nuts. Since push rods 15 are independently adjustable in length they may be relatively adjusted to obtain accurate alignment of the movable tool section with the fixed tool section. In this manner, the moving section 2 of the tool can be accurately aligned or adjusted to parallel relation with reference to plane 101 on the fixed section 3 of the tool in the closing (stamping) position of the tool, i.e. essentially at contact with the fixed section.

Figure 2:
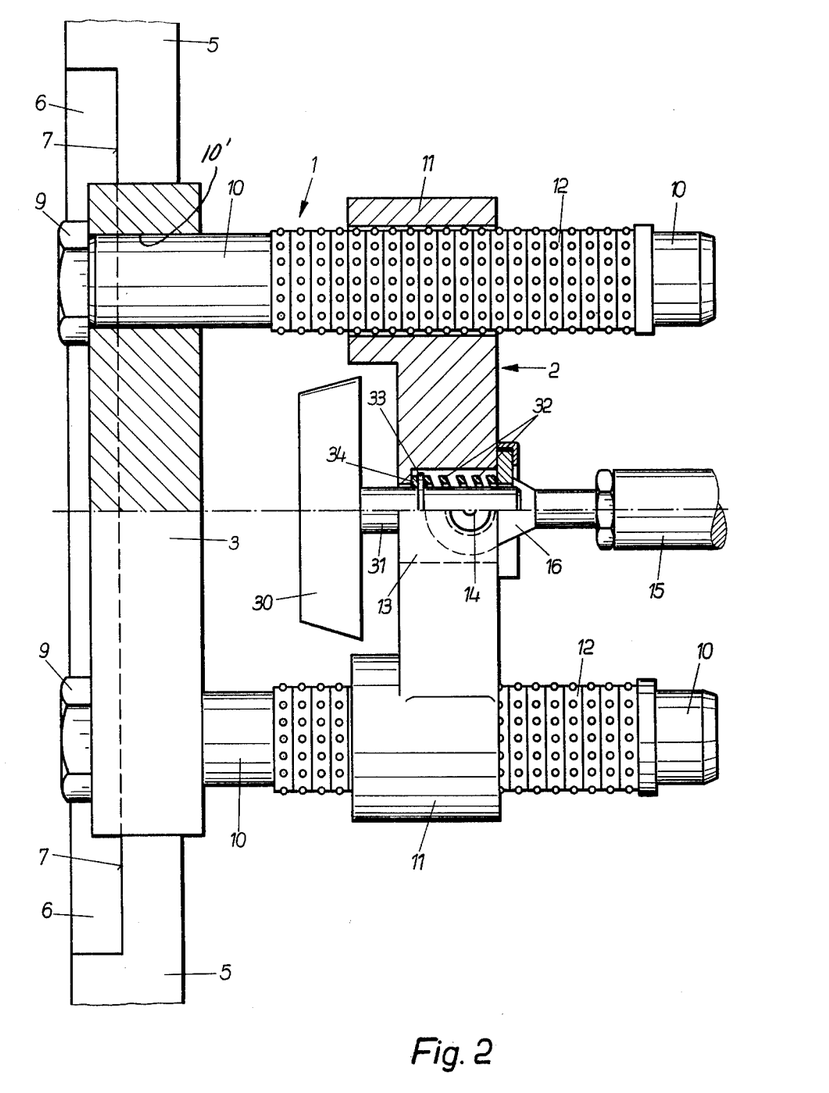
FIG. 2 is an enlarged fragmentary view partly in cross section showing the stamping tool.

As illustrated in the drawings the machined flat locating surfaces 7 on the front sides of beams 5 lie in the common vertical plane 101. At the lateral end sections the fixed tool part 3 is formed with machined flat surfaces 3' that lie in that common plane and fit snugly and accurately in full surface engagement upon surfaces 7. The forward ends of the columns 10 are all threaded to fit into and extend through openings 10', so that when nuts 9' are tight the columns 10 are rigidly secured to the frame as shown in FIG. 2. By the same token removal of nuts 9' makes possible bodily removal of the tool sections.

Figure 5:
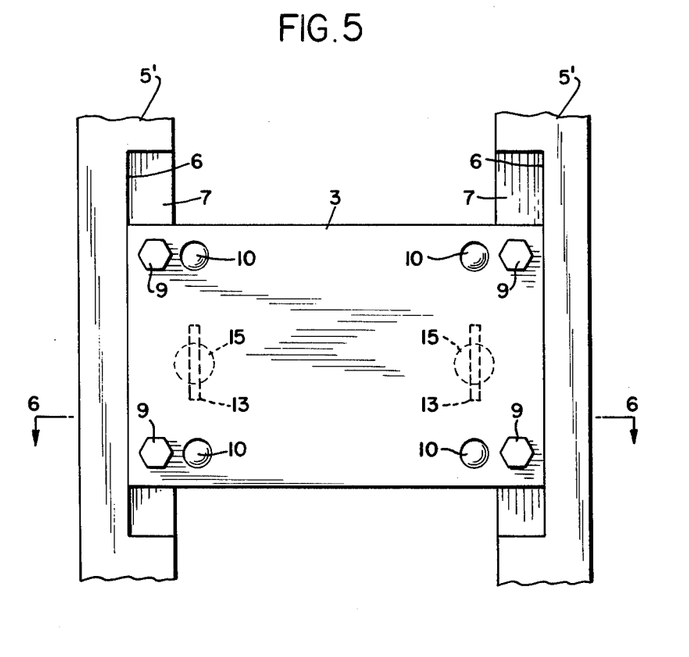
FIG. 5 is a fragmentary front elevation showing the mounting of the fixed tool part on the frame.
Figure 6:
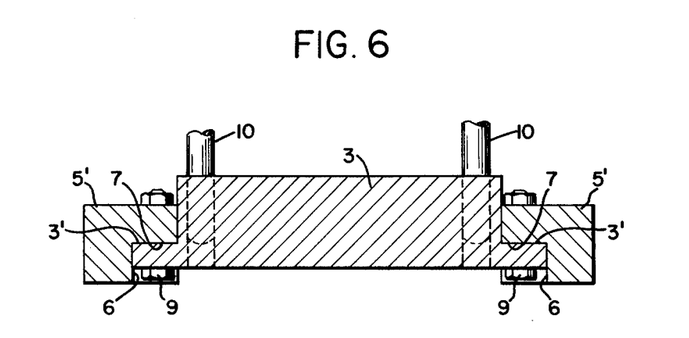
FIG. 6 is a section substantially on line 6—6 of FIG. 5.

The vertically spaced parallel sets of guide columns 10 which as shown in FIGS. 2 and 5 are laterally spaced on fixed tool part 3, are rigid with tool part 3, and they project horizontally rearwardly with respect to tool part 3 at right angles to place 101. The movable tool section 2 thereby cyclically moves horizontally back and forth on four fixed guides 10.

Rocker arm shaft 21 is fixed and extends horizontally parallel to the plane of surfaces 7. The axis of rod 19 is substantially parallel to axis 21. The reciprocable push rods 15 are pivotally connected at opposite ends to the movable tool section and the rocker arm assembly.

The combination of the features that the fixed tool section is secured on the frame and the rocker arm assembly also is mounted on the frame swingable about a fixed axis substantially parallel with respect to the locating faces 7 on the frame on which the fixed tool section is mounted, enables accurate alignment of the movable tool section with the fixed tool section to be obtainable by the push rod adjustments.

This alignment is perfectly adequate for the operation of the stamping press and has to be done only once, namely when the press is assembled. It does not have to be repeated even after a possible replacement of the tool.

Accurate opposite positioning between the moving section 2 of the tool and the fixed tool section 3 can be achieved by an adjustment in length of the drive rod 22. For this purpose, the two lugs at the ends of the drive rod 22 are provided with counter threads and secured in the rod with lock nuts as shown in FIGS. 1 and 4.

The horizontal displacement of the moving section 2 of the tool can be adjusted by changing the eccentricity of the journal pin 23 at the eccentric 24, e.g. by means of guide plates and adjusting screws (not shown). The desired alignment of the fixed section 3 of the tool with respect to the moving section 2 of the tool is usually done only once, at the push rods 15. The desired working displacement is achieved by adjusting the journal 23 of the eccentric 24 for the required eccentricity. The minimum distance between the fixed section 3 of the tool and the moving section 2 of the tool, which is determined by the thickness of the material to be stamped and passed between the tool sections 2 and 3, is accurately adjusted at the drive rod 22. The desired operating speed for the stamping press may then be adjusted at the transmission 25.

As shown in FIG. 2, the press can also be used for such tools 1 which incorporate in their moving section 2 a second section with relative movement thereto, e.g. an ejector or stripping plate 30. In the example shown, this stripping plate is provided on either side with a carrier and guide (pilot) 31. It is feasable to use several or a pair of such guides on either end of the stripping plate 30. The stripping plate 30 is kept at a distance in front of the actual moving section 2 of the tool by a compression spring 32. This spring 32 is compressed in a conventional way during the last plase of the advance movement of the moving section 2 of the tool with the stripping plate 30 contacting the fixed section 3 of the tool. In order to absorb the return shock of the stripping plate 30 caused by the release of the spring 32 during the return of the main moving section 2 of the tool, a damping ring 34 is installed on collar 33.

As also shown in FIG. 3 of the drawing, there are secondary moving parts of the tool arranged in the frame of the press 4, e.g. ejectors. The operating device 40 for these ejectors (not shown) is shown in particular in FIGS. 3 and 4. These ejectors and their operating device 40 are not mounted directly on the tool or the moving section of the tool, but more or less independently from the tool in the actual frame of the press 4. For this purpose, the frame of press 4 (FIG. 3) has in its upper section an ejector fixture 41, to which is connected a tiltable single-arm ejector actuating lever 42 and an ejector push rod 43. At the front end of the ejector push rod 43 the actual ejector carrier 44, which is linked, extends laterally to the tool 1. This carrier is connected to guide rods 45 guided on both sides of the ejector push rod 43 on the ejector fixture 41. As shown in FIG. 4, an actuating cam 46 is attached on the side of the frame of the press 4 for the operation of the ejectors. This cam is operated by the transmission 25, i.e. synchronously with the eccentric 24 and thus synchronously with the stamping movement of the tool 1. The cam follower 47 is constantly pressed against the other perimeter of the cam 46 by means of the pressure cylinder 48. Thus the rocker arm 49 which carries the follower 47 is pivoted back and forth in accordance with the contour of the cam. This pivotal movement is transmitted to a transfer lever 51 through a transfer rod 50 which as shown is adjustable in length. The back and forth pivot movement of this lever 51 is converted into an oscillatory movement of the rotatably mounted transfer axle 52, which thus pivots the actuating lever 42 accordingly and thus moves the ejector push rod 43 and the ejector carrier 44 back and forth horizontally. The upper ends of levers 42 and 51 are fixed to axle 52.

Since the transfer rod 50 and the ejector push rod 43 are adjustable in length (similar to the push rods 15) an accurate adjustment of the ejectors in rest and operating position is easily accomplished. Thus ejector displacement can be readily adjusted to the degree desired since push rod 43 may be connected at any of a number of holes in the actuating lever 42, and rod 50 may be connected at any of a number of holes in transfer lever 51, so that the transfer ratio between the transfer rod 50 and the ejector rod 43 can be adjusted to meet requirements.

The ejection movement can be arranged as desired. This can easily be achieved through cam design. It would be desirable for example to design the cam 46 in such a way that it causes a corresponding advance movement of the ejectors synchronously with the advance of the moving section 2 of the tool. As soon as the stamping operation is completed at the front end of the advance movement of the moving section 2 of the tool, cam 46 will provide for the ejection movement. This means that the secondary moving parts of the tool 1 can be designed and controlled to meet the requirements for advancing with the moving section 2 of the tool and the subsequent working stroke.

In the example shown, the stamping press has a synchronously driven second tool set 60 in addition to the main tool set 1. This second tool set serves to cut up the plastic material feeder belt into lateral narrow strips after the stampings of the molded parts have been removed at tool 1. Thus the second tool assembly 60 has been designed as a follow-on tool behind the main tool assembly 1, and, in the example shown, has its own power drive. For this purpose, a movement synchronous with the main tool assembly 1 is derived from the transmission 25 by means of a chain or belt drive 61 and transferred to a crank or eccentric gear 62. This eccentric gear 62 is connected to the moving section 64 of the second tool assembly 60 through a push rod 63 while the fixed section 65 is attached to the frame 5 of the press. The moving section of the tool 64 is guided at the fixed section of the tool 65 through frame mounted stationary guide columns 66 as shown in FIGS. 3 and 4.

Finally, there is a second actuating cam 70 in the design shown which is rotated by the transmission 25 together with the cam 46. The follower 71 of this second cam 70 is also pivot-mounted on a rocker arm and is pressed against the outer edge of the cam 70 by means of a pressure cylinder 72. The movement produced at the upper end of this rocker arm is used to gradually and periodically advance the plastic material feeder belt containing the parts to be stamped synchronously with the movement of the main tool assembly 1. The linkage and the advance mechanism that connect this second rocker arm to the actual advance mechanism are not shown for reasons of simplicity.

The stamping press and its tool assembly 1 shown in the example are designed to stamp blanks from a feeder belt of material containing the blanks molded therein and include devices for accurate alignment of the blanks to be stamped with the stamping tools, while the automatic advance is designed to release the material feeder belt at the end of an advance cycle for precise alignment of the blanks. The stamping press in accord with the invention is especially suitable for connection to a heat-molding machine, in which blanks are formed on a plastic feeder belt in quick succession, e.g. cups and other containers or the like on a conveyor of impact-resistant polystyrene.

All characteristics of the subject item stated in description, patent claims and drawings may be of essential importance for the invention by themselves or in any combination.

In the invention the opposed faces of tool sections 2 and 3 preferably bear formations (not shown) adapted for stamping premolded articles from an integral belt or web of sheet plastic, the ejector on carrier 44 removes these articles from the press, and the second tool at 60 receives the belt or web to cut up the remainder of the belt or web for disposal.

The embodiments of the invention in which an exclusive property or privilege is claimed are defined as follows:

1. In a stamping press having a stationary frame having a planar tool locating surface, a stamping tool mounted on said frame, said tool comprising a fixed tool section secured upon said planar locating surface, guiding means mounted on said fixed tool section, a movable tool section slidably supported on said guiding means for reciprocation relative to said fixed tool section and substantially at right angles to the plane of said locating surface, and means mounted on said frame operatively connected to said movable tool section for cyclically moving said movable tool section toward and away from said fixed tool section to effect stamping operations on material disposed between said tool sections, said means for moving said movable tool section comprising a rocker arm assembly pivoted on said frame for swinging about a fixed axis substantially parallel with respect to said locating surface, drive means connected for cyclically rocking said rocker arm assembly upon said axis, and a pair of substantially parallel reciprocable push rods each pivotally connected at one end to laterally spaced parts of said movable tool section and at the other end to said rocker arm assembly, said drive means thereby cyclically reciprocating said push rods and correspondingly moving said movable tool section, said rocker arm assembly having a transverse rod parallel to said axis, and said push rods being pivotally linked to said transverse rod at said other ends, and means for independently adjusting the length of each one of said push rods for effecting relative alignment of said tool sections.

2. In the stamping press defined in claim 1, said guiding means comprising spaced parallel columns mounted on said fixed tool section slidably supporting and guiding said movable tool section.

3. In the stamping press defined in claim 1, the connection between the movable tool section and each push rod comprising a removably mounted hinge member on said movable tool section, whereby said movable tool section may be removed for replacement or repair.

4. In the stamping press defined in claim 1, means for adjusting said drive means for varying displacement of said movable tool section during reciprocation.

5. In the stamping press defined in claim 1, said drive means comprising a rotatable eccentric driven by power means and having a journal pin, and a reciprocable drive rod pivotally connected at one end to said rocker arm assembly and at its other end to said journal pin.

6. In the stamping press defined in claim 5, means for adjusting the length of said drive rod for varying the minimum distance between said tool sections during operation.

7. In the stamping press defined in claim 5, said power means comprising a motor driven transmission and said rotatable eccentric being actuated by said transmission.

8. In the stamping press defined in claim 7, means for adjusting said eccentric to vary the working displacement of said movable tool section.

9. In the stamping press defined in claim 7, said transmission being an infinitely variable speed transmission.

10. In the stamping press defined in claim 1, means providing cooperating locating faces on said press frame and means providing locating faces on said fixed tool section seated on press frame faces for accurately mounting said fixed tool section on said press frame.

11. In the stamping press defined in claim 1, means for ejecting stamped out parts comprising an ejector carrier slidably mounted on ejector guide means secured to said press frame rearwardly of said movable tool section, and means for cyclically operating said carrier in synchronism with said tool operation.

12. In a stamping press defined in claim 11, said ejector guiding means being adapted for effecting reciprocating movement of said ejector carrier substantially parallel with respect to the movement of said movable tool section.

* * * * *